United States Patent
Kawakami et al.

(10) Patent No.: US 7,352,773 B2
(45) Date of Patent: Apr. 1, 2008

(54) RELAY APPARATUS AND NETWORK RELAY METHOD

(75) Inventors: Tomoe Kawakami, Ome (JP); Takehiko Okuyama, Yokohama (JP); Takashi Kokubo, Ome (JP); Jun Okazaki, Yokohama (JP); Hiroaki Kobayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 904 days.

(21) Appl. No.: 10/627,650

(22) Filed: Jul. 28, 2003

(65) Prior Publication Data

US 2004/0114614 A1 Jun. 17, 2004

(30) Foreign Application Priority Data

Jul. 29, 2002 (JP) .............................. 2002-220032

(51) Int. Cl.
*H04J 3/16* (2006.01)
(52) U.S. Cl. ........................ 370/466; 370/338; 370/401
(58) Field of Classification Search ................ 370/463, 370/465, 466, 475; 709/246
See application file for complete search history.

(56) References Cited

U.S. PATENT DOCUMENTS

| | | | |
|---|---|---|---|
| 6,044,076 A * | 3/2000 | Yamamoto ................. | 370/392 |
| 6,157,650 A | 12/2000 | Okuyama et al. | |
| 6,212,200 B1 * | 4/2001 | Iizuka et al. ................ | 370/468 |
| 6,246,696 B1 * | 6/2001 | Yamaguchi et al. ........ | 370/475 |
| 6,286,067 B1 | 9/2001 | James et al. | |
| 6,512,767 B1 * | 1/2003 | Takeda et al. .............. | 370/389 |
| 6,546,012 B2 * | 4/2003 | Kamo et al. ............. | 370/395.1 |
| 6,665,367 B1 * | 12/2003 | Blair ........................... | 377/20 |
| 7,114,008 B2 * | 9/2006 | Jungck et al. .............. | 709/246 |
| 2001/0009547 A1 * | 7/2001 | Jinzaki et al. .............. | 370/390 |
| 2002/0093960 A1 * | 7/2002 | Tsuchiya et al. ............ | 370/390 |
| 2004/0037284 A1 * | 2/2004 | Bergek et al. .............. | 370/392 |

FOREIGN PATENT DOCUMENTS

| | | |
|---|---|---|
| CN | 1185069 A | 6/1998 |
| EP | 1 313 265 A1 | 5/2003 |
| JP | 7-38582 | 2/1995 |
| JP | 7-283828 | 10/1995 |
| JP | 10-303946 | 11/1998 |
| JP | 11-177582 | 7/1999 |
| WO | WO 02/33902 A1 | 4/2002 |
| WO | WO 02/37765 A1 | 5/2002 |

OTHER PUBLICATIONS

"Draft Standard for High Performance Serial Bus Bridges", P1394. 1, Draft 0.16, 1999-2001 IEEE, pp. 10-13, Mar. 29, 2001.

(Continued)

*Primary Examiner*—Ricky Q. Ngo
*Assistant Examiner*—Kan Yuen
(74) *Attorney, Agent, or Firm*—Finnegan, Henderson, Farabow, Garrett & Dunner, L.L.P (57) ABSTRACT

A relay apparatus according to an embodiment of this invention includes an ID acquisition unit configured to acquire the unique ID of a partner device connected to a predetermined network, and a control unit which controls various processes on the basis of the unique ID of the partner device, which is acquired by the ID acquisition unit.

4 Claims, 7 Drawing Sheets

OTHER PUBLICATIONS

"Broadband Radio Access Networks (BRAN); Hiperlan Type 2; Packet Based Convergence Layer; Part 3: IEEE 1394 Service Specific Convergence Sublayer (SSCS)," ETSI TS 101 493-3 V1.1.1, pp. 1-74, Sep. 2000.

James, D.V., "Hiperlan-2 wireless informative annex as submitted to the p1394.1 committee," IEEE1394, pp. 3-12, Oct. 12, 1999.

Sato, T., "A Solution to Wireless Connections in Multi-Bus Network" 1394 Wireless Bridge With Virtual Bus, Philips, P1394.1 WG pp. 1-8, Jun. 9, 1998.

James, D.V., "Maintaining integrity by assigning new busIDs on each bus reset as submitted to the p1394.1 committe," IEEE1394, pp. 3-20, Oct. 12, 1999.

Notification of Reasons for Rejection issed by Japanese Patent Office in Feb. 8, 2005, in Japanese Application No. 2002-220032.

\* cited by examiner

RELAY APPARATUS AND NETWORK RELAY METHOD

CROSS-REFERENCE TO RELATED APPLICATIONS

This application is based upon and claims the benefit of priority from the prior Japanese Patent Application No. 2002-220032, filed Jul. 29, 2002, the entire contents of which are incorporated herein by reference.

BACKGROUND OF THE INVENTION

1. Field of the Invention

The present invention relates to a relay apparatus and network relay method which transmit/receive data between different networks.

2. Description of the Related Art

An example of a standard for transmitting synchronous data such as video data or audio data that requires certain time axis synchronization on the transmitting and receiving sides is IEEE 1394 High Performance Serial Bus (to be referred to as a 1394 bus). The 1394 bus is mounted in a device as i.LINK, FireWire, or a DV terminal.

An example of a standard for relaying (bridging) 1394 buses is IEEE 1394.1. This bridge standard is merely used for relay of 1394 buses. Hence, in this bridge standard, two 1394 buses are independently handled. In relaying one 1394 bus to the other 1394 bus, a relay apparatus executes necessary processing such as processing for partner information or sending destination information and time axis correction for the 1394 buses. To be compatible with this bridge standard, compatibility from the physical level is required. Hence, in an LSI compatible to IEEE1394a-2000, since the partner is designated including a bus ID, and the bridge serving as a transmission destination of data communication cannot be recognized, data transmission/reception cannot be executed across a bus.

The above-described prior art has the following problem. A conventional AV device incompatible to the bridge cannot communicate with another AV device that is present on another bus. Hence, a current LSI compatible to IEEE1394a-2000 must be changed. If IEEE 1394.1 is not used, two networks cannot be connected by any other standard.

BRIEF SUMMARY OF THE INVENTION

According to an aspect of the present invention, there is provided a relay apparatus comprising an ID acquisition unit configured to acquire a unique ID of a partner device connected to a predetermined network, and a control unit which controls various processes on the basis of the unique ID of the partner device, which is acquired by the ID acquisition unit.

According to another aspect of the present invention, there is provided a network relay method comprising acquiring a unique ID of a partner device connected to a predetermined network, and controlling various processes on the basis of the unique ID of the partner device.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment will be described below with reference to the accompanying drawing.

Figure 1:
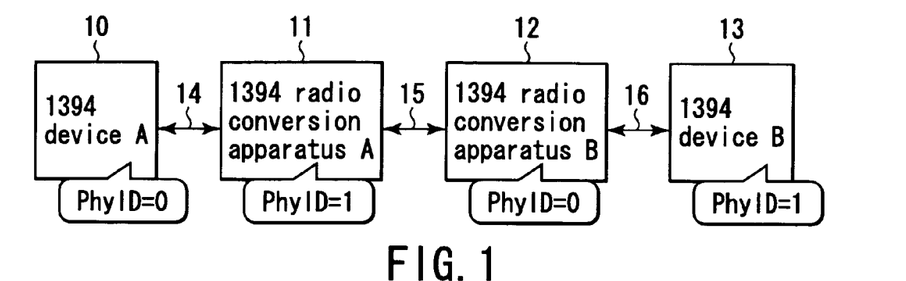
FIG. 1 is a view showing the schematic arrangement of a network system in which two different networks are connected by two network conversion apparatuses.

FIG. 1 is a view showing the schematic arrangement of a network system in which two different networks are connected by two network conversion apparatuses. As shown in FIG. 1, the network system comprises a 1394 device A 10, 1394 radio conversion apparatus A 11, 1394 radio conversion apparatus B 12, and 1394 device B 13.

The 1394 device A 10 and 1394 radio conversion apparatus A 11 are connected through a 1394 bus 14 (first network). The 1394 radio conversion apparatus B 12 and 1394 device B 13 are connected through a 1394 bus 16. The 1394 radio conversion apparatus A 11 and 1394 radio conversion apparatus B 12 are connected through a wireless network 15 (second network).

Operation when a network according to the IEEE 1394 standard is applied to the first network, and a network according to the wireless LAN standard is applied to the second network will be described.

The 1394 device A 10 has a 1394 bus terminal (i.LINK terminal) and is connected to the 1394 bus 14 through the terminal. The 1394 radio conversion apparatus A 11 is a relay apparatus which relays the network of the 1394 bus 14 and the wireless network 15. The 1394 radio conversion apparatus B 12 is a relay apparatus which relays the network of the 1394 bus 16 and the wireless network 15. The 1394 device B 13 has a 1394 bus terminal (i.LINK terminal) and is connected to the 1394 bus 16 through the terminal. The 1394 bus 14 is a network defined by the 1394 bus standard. The wireless network 15 is a wireless network defined by the wireless LAN standard. The 1394 bus 16 is a network defined by the 1394 bus standard. In the following description, assume that only four 1394 nodes are connected in the network system shown in FIG. 1.

Figure 2:
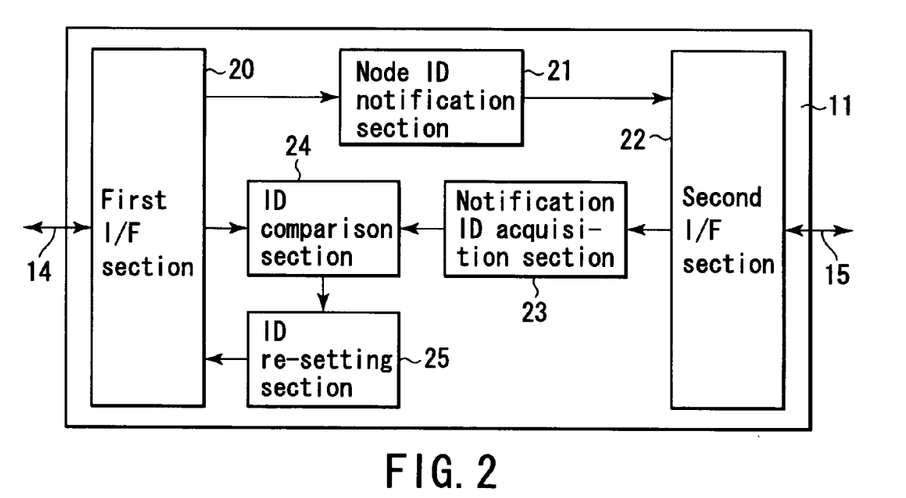
FIG. 2 is a block diagram for explaining a function of a 1394 radio conversion apparatus.
Figure 3:
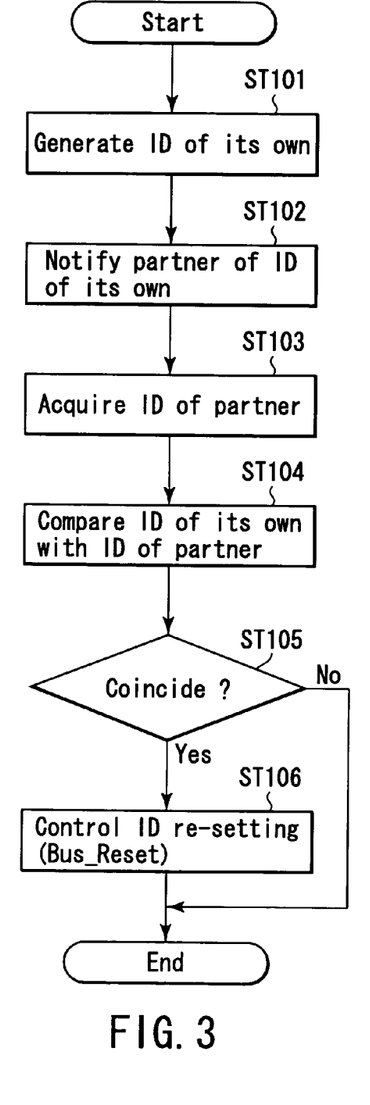
FIG. 3 is a flow chart for explaining network relay processing executed by the 1394 radio conversion apparatus shown in FIG. 2.
Figure 4:
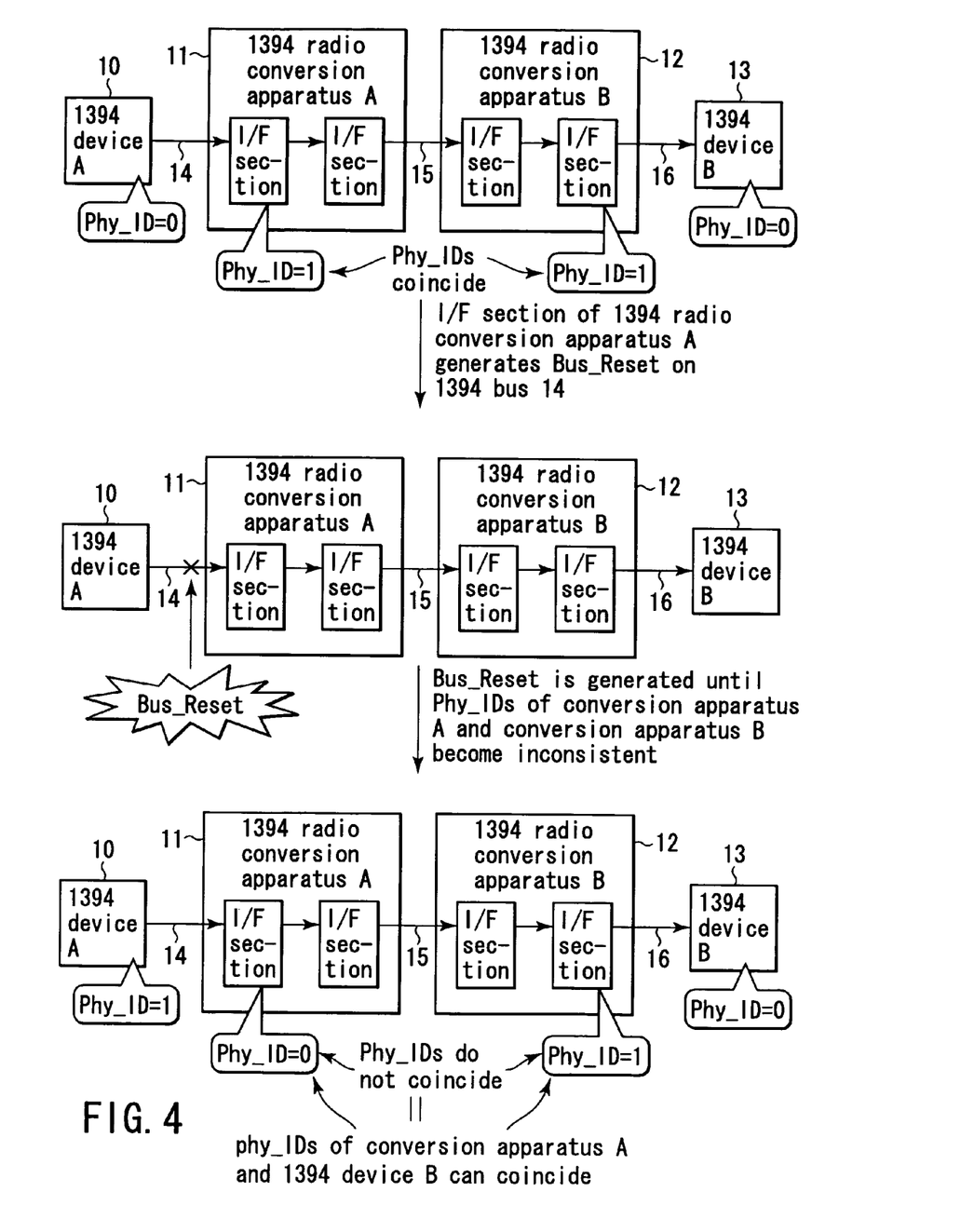
FIG. 4 is a schematic view showing a process for making Phy_IDs of the two 1394 radio conversion apparatuses inconsistent.

FIG. 2 is a block diagram for explaining a function of the 1394 radio conversion apparatus A 11. Note that the 1394 radio conversion apparatus B 12 has the same function as that of the 1394 radio conversion apparatus A 11. FIG. 3 is a flow chart for explaining network relay processing executed by the 1394 radio conversion apparatus A 11 shown in FIG. 2. That is, the flow chart shown in FIG. 3 also explains network relay processing executed by the 1394 radio conversion apparatus B 12. FIG. 4 is a schematic view showing a process for making Phy_IDs of the 1394 radio conversion apparatus A 11 and 1394 radio conversion apparatus B 12 inconsistent.

As shown in FIG. 2, the 1394 radio conversion apparatus A 11 comprises a first I/F section 20, node ID notification section 21, second I/F section 22, notification ID acquisition section 23, ID comparison section 24, and ID re-setting section 25.

The first I/F section 20 is connected to the 1394 bus 14 (first network). In addition, the first I/F section 20 generates a node Phy_ID of its own (unique ID of its own), which is allocated on the first network (ST101). The generated unique ID of its own is 0 or 1. The node ID notification section 21 notifies the 1394 radio conversion apparatus B 12 connected through the wireless network 15 of the unique ID of its own, which is allocated by the first I/F section 20 (ST102). The second I/F section 22 is connected to the wireless network 15. The notification ID acquisition section 23 acquires the Phy_ID of the 1394 radio conversion apparatus B 12 (unique ID of the partner device) which is received through the wireless network 15 (ST103). The ID comparison section 24 compares the unique ID of its own, which is allocated by the first I/F section 20, with the unique ID of the partner device, which is acquired by the notification ID acquisition section 23 to determine whether the IDs coincide with each other (ST104). If the IDs compared by the ID comparison section 24 coincide with each other (YES in ST105), the ID re-setting section 25 causes the first I/F section 20 to generate Bus_Reset (ST106). That is, the ID re-setting section 25 controls to set the ID to make the compared IDs inconsistent. This re-setting control will be described later in detail. Accordingly, when the network conversion apparatuses are connected through the second network (e.g., the wireless network 15), these network conversion apparatuses can have different IDs.

Figure 5:
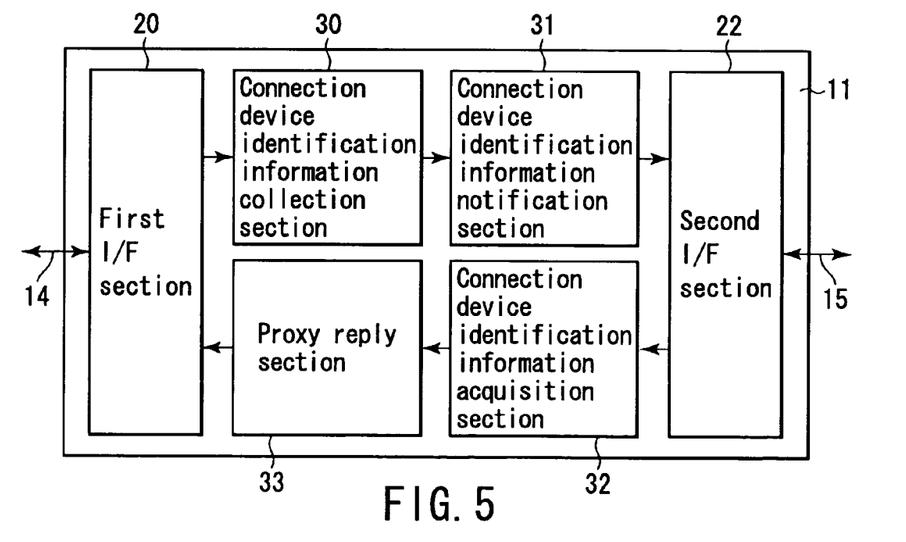
FIG. 5 is a block diagram for explaining another function of the 1394 radio conversion apparatus.
Figure 6:
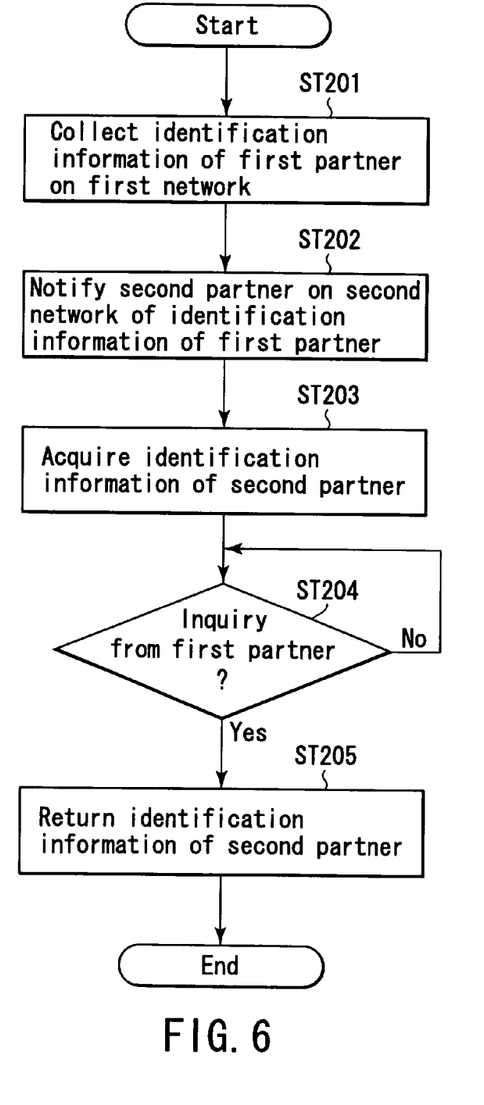
FIG. 6 is a flow chart for explaining network relay processing executed by the 1394 radio conversion apparatus shown in FIG. 5.

FIG. 5 is a block diagram for explaining another function of the 1394 radio conversion apparatus A 11. That is, the 1394 radio conversion apparatus A 11 also has the arrangement shown in FIG. 5 in addition to that shown in FIG. 2. Note that the 1394 radio conversion apparatus B 12 has the same arrangement as that of the 1394 radio conversion apparatus A 11. FIG. 6 is a flow chart for explaining network relay processing executed by the 1394 radio conversion apparatus A 11 shown in FIG. 5. That is, the flow chart shown in FIG. 6 also explains network relay processing executed by the 1394 radio conversion apparatus B 12.

As shown in FIG. 5, the 1394 radio conversion apparatus A 11 comprises a connection device identification information collection section 30, connection device identification information notification section 31, connection device identification information acquisition section 32, and proxy reply section 33.

The connection device identification information collection section 30 collects identification information such as the Config ROM of the 1394 device (1394 device A 10 shown in FIG. 1) connected through the 1394 bus 14 (ST201). The connection device identification information notification section 31 notifies the 1394 radio conversion apparatus B 12 which is connected through the second I/F section 22 and wireless network 15 of the identification information of the 1394 device (1394 device A 10 shown in FIG. 1), which is acquired by the connection device identification information collection section 30 (ST202). The connection device identification information acquisition section 32 acquires the identification information of the 1394 device (1394 device B 13 shown in FIG. 1), which is received through the wireless network 15 (ST203). The proxy reply section 33 stores the identification information of the 1394 device (1394 device B 13 shown in FIG. 1), which is acquired by the connection device identification information acquisition section 32. When an inquiry is received from the 1394 device (1394 device A 10 shown in FIG. 1) connected through the 1394 bus 14 (YES in ST204), the proxy reply section 33 sends a reply on behalf of the 1394 device (1394 device B 13 shown in FIG. 1) (ST205). That is, in response to an inquiry from the 1394 device A 10, the 1394 radio conversion apparatus A 11 disguises as the 1394 device B 13 and returns the identification information of the 1394 device B 13. Accordingly, the 1394 radio conversion apparatus A 11 can disguise as the device which has the identification information acquired through the second network (wireless network 15). Hence, the device can be handled as if it were connected through the 1394 bus 14.

The description that have been made with reference to FIGS. 1 to 5 will be summarized. The 1394 radio conversion apparatus A 11 can have the same Phy_ID as that of the 1394 device B 13. The 1394 radio conversion apparatus A 11 can disguise as the 1394 device B 13 and send a reply to the 1394 device A 10. Similarly, the 1394 radio conversion apparatus B 12 can have the same Phy_ID as that of the 1394 device A 10. The 1394 radio conversion apparatus B 12 can disguise as the 1394 device A 10 and send a reply to the 1394 device B 13.

Figure 7:
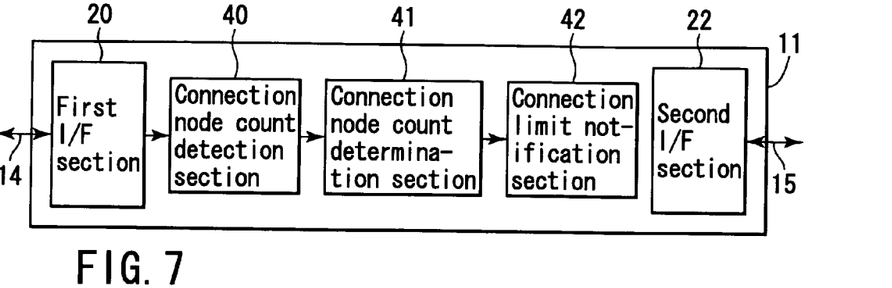
FIG. 7 is a block diagram for explaining still another function of the 1394 radio conversion apparatus.
Figure 8:
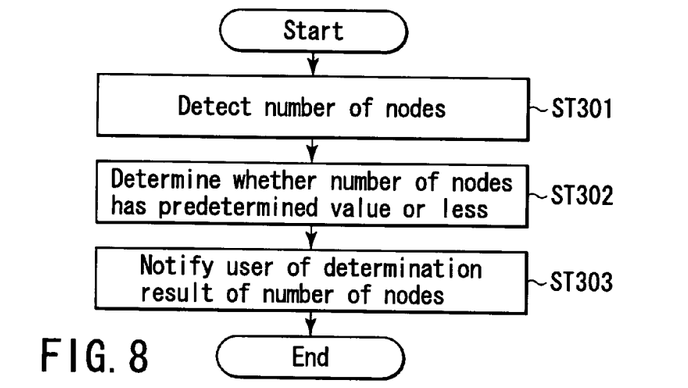
FIG. 8 is a flow chart for explaining network relay processing executed by the 1394 radio conversion apparatus shown in FIG. 7.

FIG. 7 is a block diagram for explaining still another function of the 1394 radio conversion apparatus A 11. That is, the 1394 radio conversion apparatus A 11 also has the arrangement shown in FIG. 7 in addition to those shown in FIGS. 2 and 5. Note that the 1394 radio conversion apparatus B 12 has the same arrangement as that of the 1394 radio conversion apparatus A 11. FIG. 8 is a flow chart for explaining network relay processing executed by the 1394 radio conversion apparatus A 11 shown in FIG. 7. That is, the flow chart shown in FIG. 8 also explains network relay processing executed by the 1394 radio conversion apparatus B 12.

As shown in FIG. 7, the 1394 radio conversion apparatus A 11 comprises a connection node count detection section 40, connection node count determination section 41, and connection limit notification section 42.

The connection node count detection section 40 detects the number of 1394 nodes connected through the 1394 bus 14 in accordance with the IEEE 1394 standard (ST301). For example, the number of nodes is detected on the basis of SelfID packets collected from the nodes. The connection node count determination section 41 determines whether, e.g., the number of 1394 nodes, which is detected by the connection node count detection section 40, is 2 or less, including the self node (1394 radio conversion apparatus A 11) (ST302). The connection limit notification section 42 notifies the user of the determination result by the connection node count determination section 41 (ST303). For example, when the detected number of nodes is 2 or more, including the self node, the connection limit notification section 42 notifies the user of it. The connection limit notification section 42 notifies the user that, e.g., the number of connections is limited. That is, the user is notified that the number of connections to the 1394 radio conversion apparatus A 11 is limited to n (e.g., 1). The notification here includes display on the display means of the self node or display on the display means of another node.

As described above, when a connection limit is added to the 1394 radio conversion apparatus, the Phy_ID of the 1394 radio conversion apparatus connected through the second network and that of the device connected through the first network can always be made to coincide with each other. Accordingly, the devices connected through the first and second networks can exchange data as if they were connected through only the first network. In addition, any data acquisition by an unexpected third party can be prevented.

Figure 9:
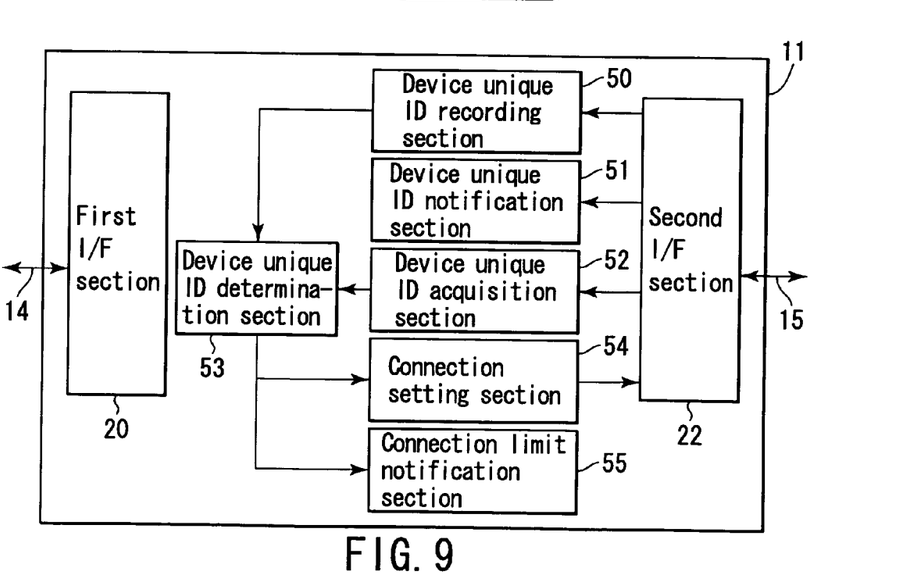
FIG. 9 is a block diagram for explaining still another function of the 1394 radio conversion apparatus.
Figure 10:
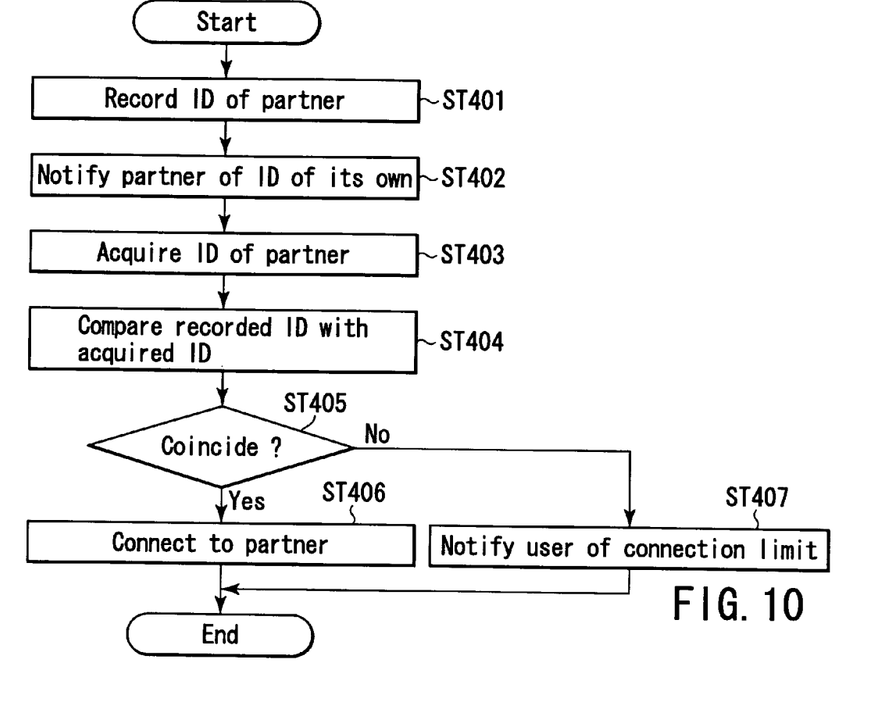
FIG. 10 is a flow chart for explaining network relay processing executed by the 1394 radio conversion apparatus shown in FIG. 9.

FIG. 9 is a block diagram for explaining still another function of the 1394 radio conversion apparatus A 11. That is, the 1394 radio conversion apparatus A 11 also has the arrangement shown in FIG. 9 in addition to those shown in FIGS. 2, 5, and 7. Note that the 1394 radio conversion apparatus B 12 has the same arrangement as that of the 1394 radio conversion apparatus A 11. FIG. 10 is a flow chart for explaining network relay processing executed by the 1394 radio conversion apparatus A 11 shown in FIG. 9. That is, the flow chart shown in FIG. 10 also explains network relay processing executed by the 1394 radio conversion apparatus B 12.

As shown in FIG. 9, the 1394 radio conversion apparatus A 11 comprises a device unique ID recording section 50, device unique ID notification section 51, device unique ID acquisition section 52, device unique ID determination section 53, connection settling section 54, and connection limit notification section 55.

The device unique ID recording section 50 records the device unique ID (GUID) of the device connected through the wireless network 15 (ST401). The device unique ID notification section 51 notifies the device (1394 radio conversion apparatus B 12 shown in FIG. 1) connected through the wireless network 15 of the device unique ID (GUID) of the self node (ST402). The device unique ID acquisition section 52 acquires a device unique ID (GUID of the 1394 radio conversion apparatus B 12 shown in FIG. 1) received through the wireless network 15 (ST403). The device unique ID determination section 53 determines whether the device unique ID recorded by the device unique ID recording section 50 coincides with that acquired by the device unique ID acquisition section 52 (ST404). If it is confirmed by determination by the device unique ID determination section 53 that the two device unique IDs coincide with each other (YES in ST405), the connection settling section 54 executes, via the second I/F section 22, connection operation to the partner device (1394 radio conversion apparatus B 12 shown in FIG. 1) connected through the wireless network 15 (ST406). If it is not confirmed that the two device unique IDs coincide with each other (NO in ST405), the connection limit notification section 55 notifies the user that connection is restricted (ST407). The notification here includes display on the display means of the self node or display on the display means of another node.

Figure 11:
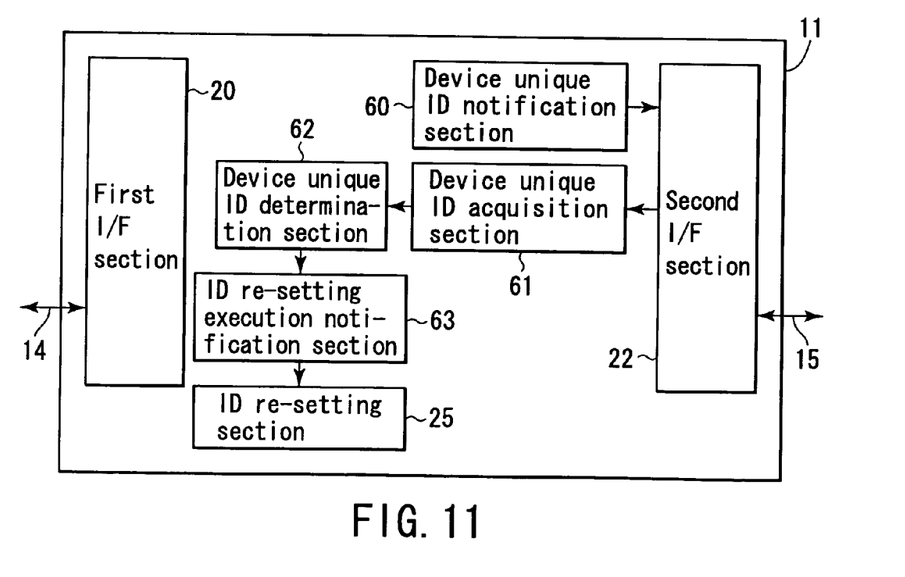
FIG. 11 is a block diagram for explaining still another function of the 1394 radio conversion apparatus.
Figure 12:
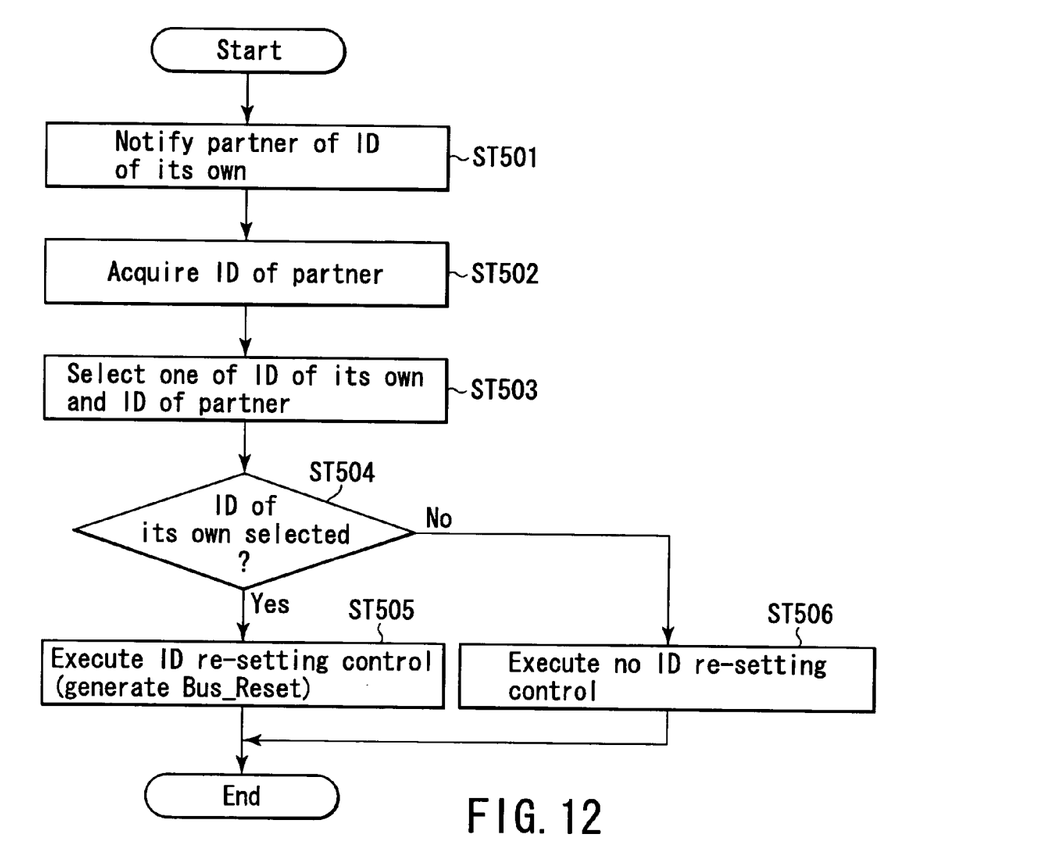
FIG. 12 is a flow chart for explaining network relay processing executed by the 1394 radio conversion apparatus shown in FIG. 11.

FIG. 11 is a block diagram for explaining still another function of the 1394 radio conversion apparatus A 11. That is, the 1394 radio conversion apparatus A 11 also has the arrangement shown in FIG. 11 in addition to those shown in FIGS. 2, 5, 7, and 9. Note that the 1394 radio conversion apparatus B 12 has the same arrangement as that of the 1394 radio conversion apparatus A 11. FIG. 12 is a flow chart for explaining network relay processing executed by the 1394 radio conversion apparatus A 11 shown in FIG. 11. That is, the flow chart shown in FIG. 12 also explains network relay processing executed by the 1394 radio conversion apparatus B 12.

As shown in FIG. 11, the 1394 radio conversion apparatus A 11 comprises a device unique ID notification section 60, device unique ID acquisition section 61, device unique ID determination section 62, an ID re-setting execution notification section 63.

The device unique ID notification section 60 notifies the device (1394 radio conversion apparatus B 12 shown in FIG. 1) connected through the wireless network 15 of a device unique ID (GUID or a preset serial number) uniquely defined for each apparatus (ST501). The device unique ID acquisition section 61 acquires the device unique ID (the ID of the 1394 radio conversion apparatus B 12 shown in FIG. 1) received through the wireless network 15 (ST502). The device unique ID determination section 62 that has a criterion selects one of the device unique ID of the self node (the ID of the 1394 radio conversion apparatus A 11 shown in FIG. 1) and the device unique ID acquired by the device unique ID determination section 62 (the ID of the 1394 radio conversion apparatus B 12 shown in FIG. 1) (ST503). For example, when a GUID is employed as a device unique ID, one of the device unique IDs is selected using the numerical value of each GUID as a criterion. When a serial number is employed as a device unique ID, one of the device unique IDs is selected using the presence of a certain bit in a bit field representing each serial number. When the device unique ID of the self node is selected by the device unique ID determination section 62 (YES in ST504), the ID re-setting execution notification section 63 notifies the user that the ID re-setting section 25 should operate on the basis of the result from the ID comparison section 24 (generate Bus_Reset) (ST505). If the selected device unique ID is not that of the self node (NO in ST504), no operation notification is sent (ST506). That is, the ID re-setting section 25 is not operated independently of the result from the ID comparison section 24.

Accordingly, when the ID of the 1394 radio conversion apparatus A 11 and that of the 1394 radio conversion apparatus B 12 coincide with each other, only one of the 1394 radio conversion apparatus A 11 and 1394 radio conversion apparatus B 12 can be caused to generate Bus_Reset to make the IDs inconsistent. That is, simultaneous ID re-setting by both the 1394 radio conversion apparatuses can be prevented, and the ID can stably be determined in early stage. Alternatively, the ID re-setting section 25 may be prepared in only one of the 1394 radio conversion apparatus A 11 and 1394 radio conversion apparatus B 12. If the ID re-setting section 25 is prepared in only one of the 1394 radio conversion apparatus A 11 and 1394 radio conversion apparatus B 12, no simultaneous Bus_Reset generation takes place.

Figure 13:
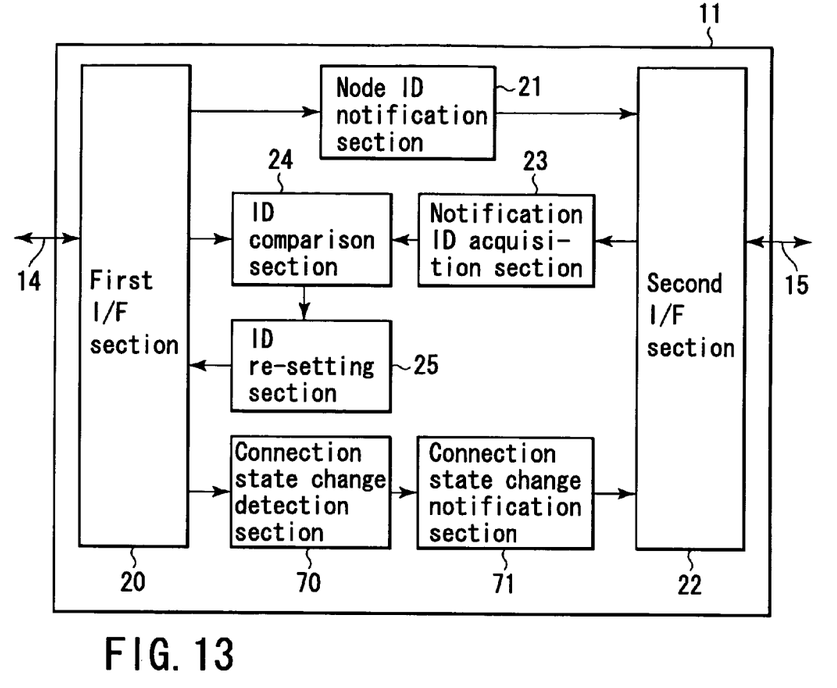
FIG. 13 is a block diagram for explaining still another function of the 1394 radio conversion apparatus.
Figure 14:
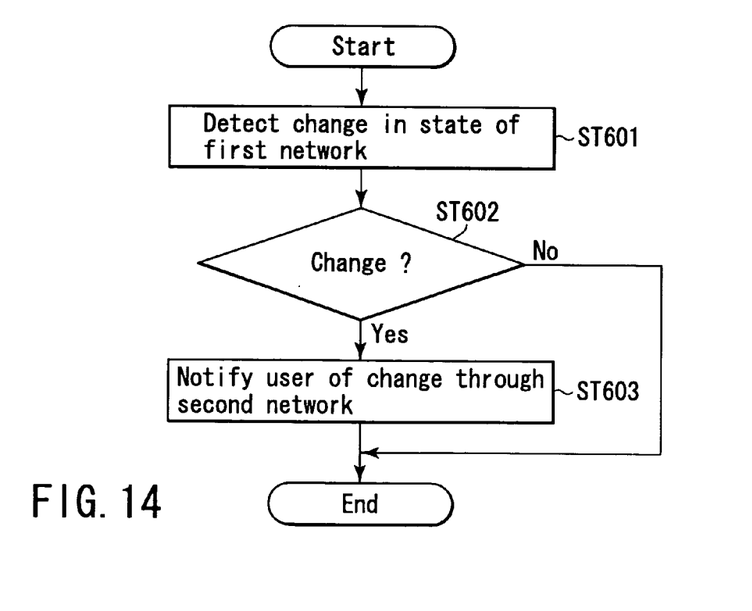
FIG. 14 is a flow chart for explaining network relay processing executed by the 1394 radio conversion apparatus shown in FIG. 13.

FIG. 13 is a block diagram for explaining still another function of the 1394 radio conversion apparatus A 11. That is, the 1394 radio conversion apparatus A 11 also has the arrangement shown in FIG. 13 in addition to those shown in FIGS. 2, 5, 7, 9, and 11. Note that the 1394 radio conversion apparatus B 12 has the same arrangement as that of the 1394 radio conversion apparatus A 11. FIG. 14 is a flow chart for explaining network relay processing executed by the 1394 radio conversion apparatus A 11 shown in FIG. 13. That is, the flow chart shown in FIG. 14 also explains network relay processing executed by the 1394 radio conversion apparatus B 12.

As shown in FIG. 13, the 1394 radio conversion apparatus A 11 comprises a connection state change detection section 70 and connection state change notification section 71. The connection state change detection section 70 detects whether the network state on the 1394 bus 14 has changed (ST601). When a change is detected by the connection state change detection section 70 (YES in ST602), the connection state change notification section 71 notifies, through the wireless network 15, the 1394 radio conversion apparatus B 12 that the network state on the 1394 bus 14 has changed (ST603).

According to the above-described network system, the device connected to the second network (wireless network 15) different from the first network (1394 bus 14) can be regarded as a device connected to the first network and networked.

In addition, when the first network (1394 bus) in a one-to-one connection state is limited to the bridge arrangement through the second network (wireless network), the Phy_ID of the partner device can be determined without using the IEEE 1394.1 standard. This allows bridge using an already commercially available 1394 bus compatible device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A relay apparatus comprising:
a first connection unit configured to connect with a first network:
a second connection unit configured to connect with a second network different from the first network;
an ID generation unit configured to generate an own unique ID of its own, which is to be allocated on the first network;
an ID notification unit configured to notify a partner device connected to the second network through the second connection unit of the own unique ID of its own;
an ID acquisition unit configured to acquire the partner unique ID of a partner device connected to the second network through the second connection unit;
an ID comparison unit configured to compare the own unique ID of its own with the partner unique ID of the partner device;
a control unit which controls to set only one of the own unique ID and the partner unique ID to make the IDs inconsistent, when it is found as a result of comparison by the comparison unit that the own unique ID of its own coincides with the partner unique ID of the partner device;
a device count detection unit configured to detect the number of partner devices on the first network; and
a connection limit notification unit configured to notify a user of information related to a connection limit to the partner device on the basis of a detection result of the number of partner devices by the device count detection unit.

2. A relay apparatus comprising:
a first connection unit configured to connect with a first network;
a second connection unit configured to connect with a second network different from the first network;
an ID generation unit configured to generate an own unique ID of its own, which is to be allocated on the first network;
an ID notification unit configured to notify a partner device connected to the second network through the second connection unit of the own unique ID of its own;
an ID acquisition unit configured to acquire the partner unique ID of a partner device connected to the second network through the second connection unit;
an ID comparison unit configured to compare the own unique ID of its own with the partner unique ID of the partner device;
a control unit which controls to set only one of the own unique ID and the partner unique ID to make the IDs inconsistent, when it is found as a result of comparison by the comparison unit that the own unique ID of its own coincides with the partner unique ID of the partner device;
an identification information collection unit configured to collect first identification information from a partner device connected to the first network through the first connection unit;
an identification information notification unit configured to notify the partner device connected to the second network through the second connection unit of the first identification information;
an identification information acquisition unit configured to acquire second identification information from the partner device connected to the second network through the second connection unit;
a reply unit configured to return the second identification information in response to an inquiry about the second identification information from the partner device connected to the first network through the first connection unit;
a device count detection unit configured to detect the number of partner devices on the first network; and
a connection limit notification unit configured to notify a user of information related to a connection limit to the partner device on the basis of a detection result of the number of partner devices by the device count detection unit.

3. A network relay method of relaying a first network and a second network different from the first network, comprising:
generating an own unique ID of its own, which is to be allocated on the first network;
notifying a partner device connected to the second network different from the first network of the own unique ID of its own;
acquiring a partner unique ID of the partner device connected to the second network;
comparing the own unique ID of its own with the partner unique ID of the partner device;
setting only one of the own unique ID and the partner unique ID to make the IDs inconsistent, when it is found as a result of comparison by the comparison unit that the own unique ID of its own coincides with the partner unique ID of the partner device;

detecting the number of partner devices on the first network; and notifying a user of information related to a connection limit to the partner device on the basis of a detection result of the number of partner devices.

4. A network relay method of relaying a first network and a second network different from the first network, comprising:

generating an own unique ID of its own, which is to be allocated on the first network;

notifying a partner device connected to the second network different from the first network of the own unique ID of its own;

acquiring a partner unique ID of the partner device connected to the second network;

comparing the own unique ID of its own with the partner unique ID of the partner device;

setting only one of the own unique ID and the partner unique ID to make the IDs inconsistent, when it is found as a result of comparison by the comparison unit that the own unique ID of its own coincides with the partner unique ID of the partner device;

collecting first identification information from a partner device connected to the first network;

notifying the partner device connected to the second network of the first identification information;

acquiring second identification information from the partner device connected to the second network;

returning the second identification information in response to an inquiry about the second identification information from the partner device connected to the first network;

detecting the number of partner devices on the first network; and notifying a user of information related to a connection limit to the partner device on the basis of a detection result of the number of partner devices.

* * * * *